Patented July 7, 1953

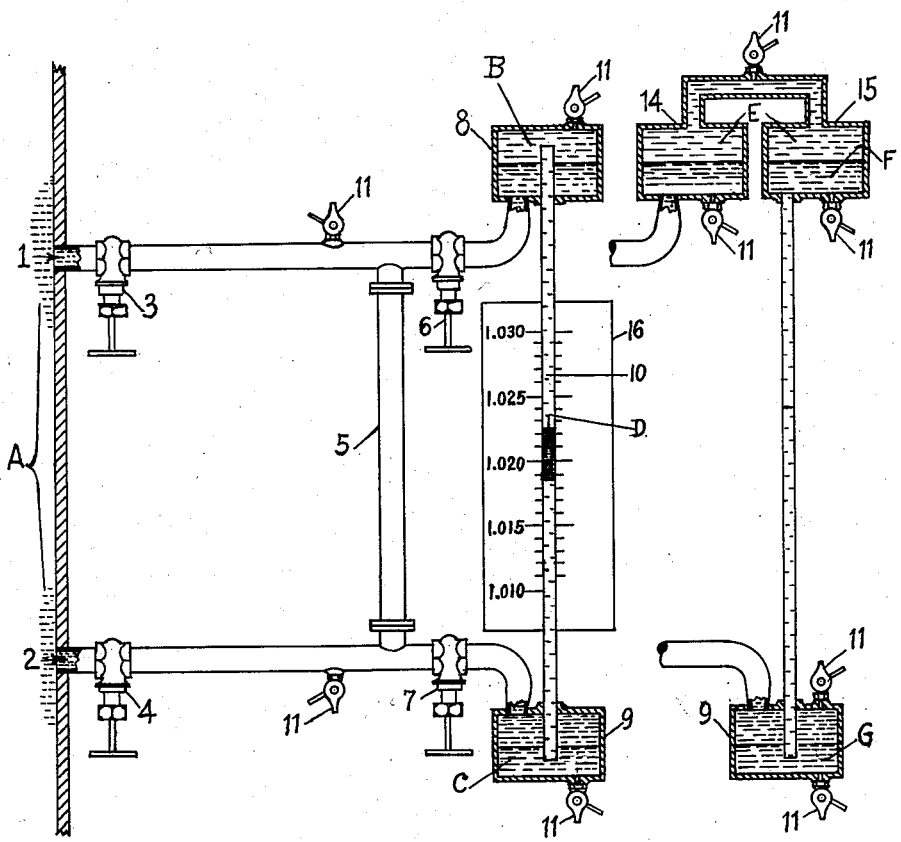

2,644,329

UNITED STATES PATENT OFFICE 2,644,329

DENSITY METER

Alfred C. Redfield, Woods Hole, Mass., assignor to the United States of America as represented by the Secretary of the Navy Application November 28, 1944, Serial No. 565,512

2 Claims. (Cl. 73—32)

This invention relates to apparatus for measuring the density of fluids. The apparatus has been developed for measuring the density of sea water from a vessel, but is not limited to this application.

The object of the present invention is to record the difference between the pressure of the fluid mass whose density is to be measured at two points separated by a fixed vertical distance.

A further object is to record this difference by balancing the fluid whose density is being measured against a column composed of two fluids of suitable density and color whose movement up and down can be observed and recorded.

A further object is to provide two ports in the hull of a ship or submarine vertically spaced a predetermined distance and connected to a differential pressure measuring means calibrated to indicate the density of the surrounding water.

A further object is to connect the above ports to a manometer tube through reservoir chambers at the top and bottom thereof providing non-miscible contact surfaces between the water in the upper port and a lighter liquid in the upper chamber, and between the water in the lower port and a heavier liquid in the lower chamber respectively, the two liquids being separated in the manometer tube by a mutually non-miscible liquid of intermediate density.

Further and more specific objects will appear as the description of the present disclosure proceeds, having reference to the accompanying drawings, wherein:

Fig. 1 is a schematic drawing showing one form of apparatus that may be used to carry out the present invention, and Fig. 2 illustrates schematically a modification of the means for maintaining the separation of the several liquids used.

In the schematic drawing, Fig. 1, the apparatus measures the difference in pressure of a fluid A at points 1 and 2. For example, the fluid A may be the sea water outside the hull of a vessel in the hull of which 1 and 2 are apertures. Valves located at 3 and 4 may be used to shut off the apparatus from the fluid to be measured, either to make adjustments, or to isolate a column of fluid in tube 5 so that it will not be affected by accidental changes of pressure at 1 and 2, or to isolate a column of fluid so that its density can be measured when the density of the fluid outside the apparatus has changed. Valves 6 and 7 may be closed in order to make adjustments without losing a column of fluid trapped in tube 5, or to protect the measuring fluids from derangement by accidental pressure at 1 and 2 while taking a sample of fluid into tube 5. Traps 8 and 9 are suitably designed to keep the fluid which is being measured separate from the fluids balanced against it in column 10.

Several types of traps have been used. In the arrangement shown in the main drawing, using traps 8 and 9, a lighter fluid B rests on the fluid A in trap 8, while in trap 9 the fluid A rests on a heavier fluid C. The reservoirs of fluids B and C, under pressure from the fluid A at points 1 and 2 respectively, are connected by the transparent measuring or manometer tube 10. Fluids B and C must be immiscible with fluid A. If fluids B and C will mix with each other, as for example, if B is a light oil and C a heavy oil, they are separated by a small quantity of immiscible fluid D whose density is more than B and less than C, for example, distilled water. A modified arrangement of traps, illustrated in Fig. 2, is required if one of the fluids used in the measuring tube will mix with fluid A whose density is to be measured. If, for example, the lighter fluid F in the measuring column is distilled water and the fluid A is sea water, then traps 14 and 15 serve to separate fluids A and F by an immiscible fluid E, a light oil. The heavier fluid G, a heavy oil, is trapped by the same arrangement 9 as in the main drawing. If the heavier fluid used were one which will mix with sea water, for example, an aqueous solution, a suitable adjustment of traps at the bottom of the measuring tube 10 could also be effected. Pet cocks 11 are arranged to facilitate filling, drainage and adjustment.

By providing that the densities of fluids B and C have a suitable relation to the possible range of densities of fluid A, the density of fluid A can be measured by observing the height of fluid C in column 10. Column 10 can be set against a scale 16 calibrated for this purpose. Oils, aqueous solutions or other fluids of suitable densities may be used, with modifications of the traps as necessary. In measuring the density of sea water, which varies between 1.00 and 1.03, oil with a density .94 has been used for fluid B, oil with a density 1.030 for fluid C, and distilled water for fluid D.

The apparatus permits the measurement of density to be made continuously. The apparatus could be employed, for example, in following chemical or fermentative processes, or indicating the state of the electrolite in storage batteries, or other conditions where processes take place influencing the density of fluids.

Other modifications in the arrangement and

What is claimed is:

1. A fluid density meter comprising a transparent vertical tube filled with two immiscible fluids of differing densities, one of which is of higher density and the other of lower density than the range of densities of the fluid to be measured and both immiscible therewith, means including a reservoir surrounding the lower end of the tube and filled with said heavier fluid to a point above the end of the tube for supplying to and receiving from the tube a volume of the fluid substantially equal to the volume of the tube, a reservoir surrounding the upper end of the tube and disposed with the tube extending into the upper portion of the reservoir, the reservoir having therein sufficient of said lighter fluid to surround and fill the upper end of the tube at all times, a pair of conduits extending respectively into the lower and upper reservoirs at the upper and lower faces thereof, respectively, a vertical column of the fluid to be measured having a height and elevation substantially equal to the height and elevation of the tube and communicating with the reservoirs through said conduits for conducting the fluid to be measured into the upper reservoir beneath the lighter fluid and into the lower reservoir over the heavier fluid, means for adjusting the volumes of the lighter and heavier fluids in the reservoirs and closing the system with the weight of the column and tube fluids in equilibrium such that the fluid interface in the tube traverses the length thereof in response to the maximum change in density within said range of the fluid in said column as the lighter sample thereof partially displaces the lighter fluid in the upper reservoir and as the heavier sample thereof partially displaces the heavier fluid in the lower reservoir.

2. The fluid density meter of claim 1 in which the upper fluid in the tube is miscible with the fluid to be measured and in which the tube extends only to the lower portion of the upper reservoir and said upper fluid has thereon a third fluid of less density and immiscible with said upper fluid and the fluid to be measured, having a third reservoir of substantially the same size and elevation as said upper reservoir in sealed fluid transferring relation therewith and having the upper portion thereof filled with said third fluid, the upper of said conduits conducting the fluid to be measured to the lower portion of the third reservoir, whereby the weight of fluid in the column and tube are in equilibrium without contact between the miscible fluids.

ALFRED C. REDFIELD.

References Cited in the file of this patent

UNITED STATES PATENTS

| Number | Name | Date |
| --- | --- | --- |
| 1,869,400 | Underwood | Aug. 2, 1932 |
| 2,115,520 | Decker | Apr. 26, 1938 |
| 2,279,254 | Irwin | Apr. 7, 1942 |
| 2,286,919 | McNeill | June 16, 1942 |
| 2,325,251 | Knisely | July 27, 1943 |
| 2,371,457 | Mendius | Mar. 13, 1945 |